(No Model.)
F. MANNING.
WIRE GATE.
No. 450,171. Patented Apr. 14, 1891.
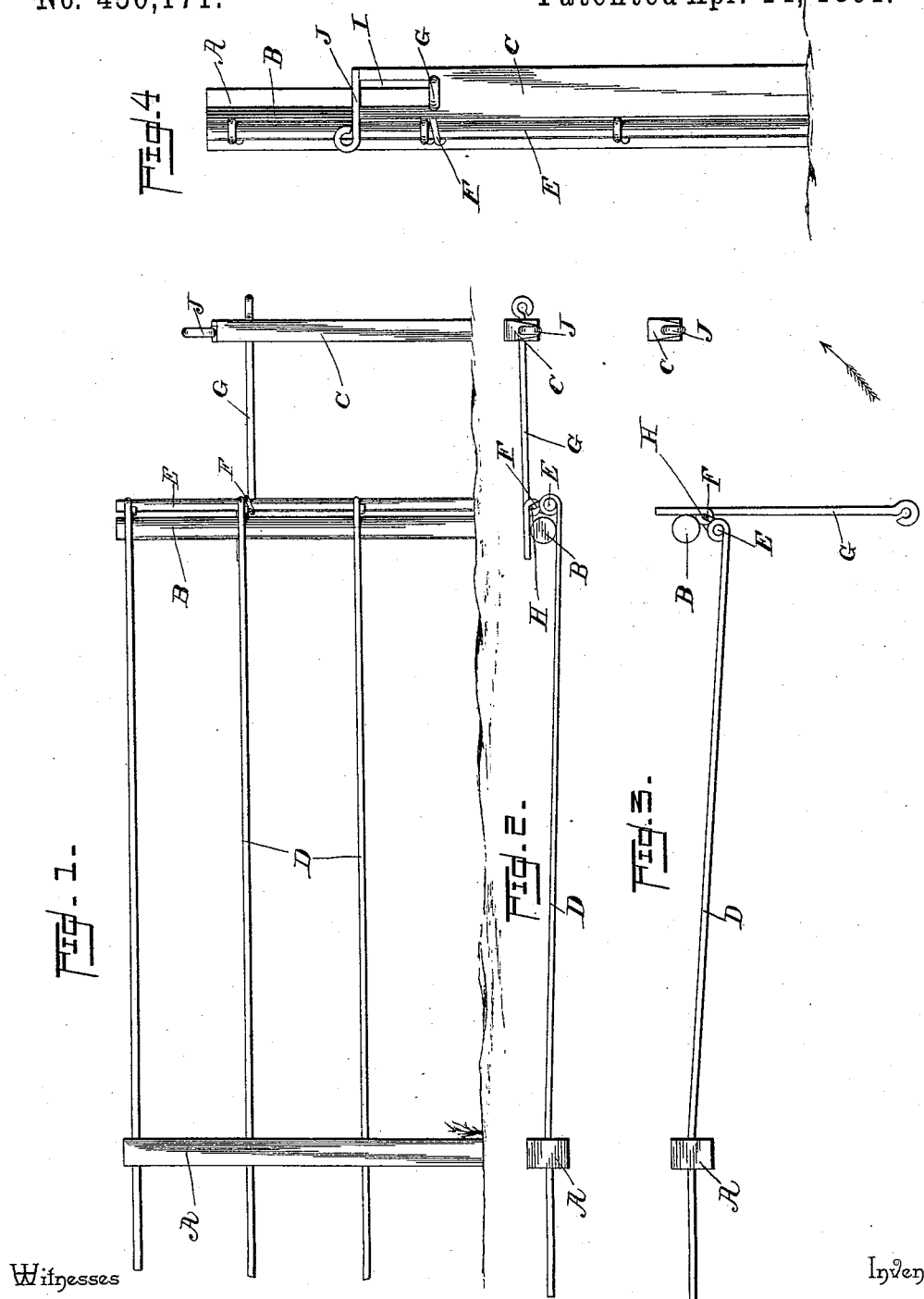
Witnesses
E. T. Duvall Jr.
N. L. Collamer
Inventor
Franklin Manning
By his Attorneys,
C. A. Snow & Co.
THE NORRIS PETERS CO., PHOTO-LITHO., WASHINGTON, D. C.

UNITED STATES PATENT OFFICE.

FRANKLIN MANNING, OF WEST POINT, NEBRASKA.

WIRE GATE.

SPECIFICATION forming part of Letters Patent No. 450,171, dated April 14, 1891.

Application filed November 14, 1890. Serial No. 371,428. (No model.)

*To all whom it may concern:*

Be it known that I, FRANKLIN MANNING, a citizen of the United States, residing at West Point, in the county of Cuming and State of Nebraska, have invented a new and useful Wire Gate, of which the following is a specification.

This invention relates to gates for wire fences and to the means of fastening the same; and the object of the invention is to provide an improved gate of this character which shall be very simple and cheap in construction and durable and efficient in operation.

To this end the invention consists of the details hereinafter more fully described and claimed, and illustrated in the drawings, in which—

Figure 1 is a side elevation of this improved gate closed. Fig. 2 is a plan view of the same. Fig. 3 is a plan view of the same, showing the gate in the operation of being closed. Fig. 4 is an end view showing the form of catch I preferably use for a locking lever or latch.

Referring to the drawings, the letter A designates the inner and B the outer post of the gate, and adjacent to the latter is situated the latch-post C. The fence-wires D are continued through the inner post to the vertical bar E, which stands parallel with the outer post, to which bar they are connected at their ends. I have shown the wires as thus continued from the fence-wires proper without the use of hinges, although it will be understood that an ordinary hinge might be used, if desired.

Linked to the vertical bar E at the free end of the gate, preferably by a small wire loop F, is the operating-lever G. This lever is preferably constructed with an eye H near one end, to which the loop F is connected, and preferably extends for a considerable distance at one side of this eye to form the handle. The latch-post C has a notch I in its upper end. Connected to one of the prongs of the notch is a spring J, which normally bears upon the other prong and closes the open end of the notch.

In operation the gate is closed as shown in Fig. 3, the short end of the locking-lever being passed around the outer post B, and the longer end of said lever carried onward and passed beneath the spring J and seated in the notch. It will be seen that the locking-lever can be disengaged from this notch by merely passing it from beneath the spring and releasing it, and the gate is then free to be opened in any direction. The length of the wires D from the inner post to the bar E is slightly less than the distance between the inner and outer posts, and hence when the locking-lever is passed around the outer post and moved so as to be seated in the notch a strong tension will be given to the wires, which tension will continue as long as the gate remains closed.

This improved gate cannot be opened by stock rubbing their noses against it—a common fault with farm-gates as generally constructed.

What is claimed as new is—

In a gate, the combination, with an inner, an outer, and a latch post, wires leading from the inner post, and a bar adjacent the outer post, to which said wires are connected, of a locking-lever flexibly connected at a point near one of its ends to said bar at the free end of the gate, its longer arm reaching to said latching-post, the latter being provided with a vertical notch adapted to receive said locking-bar, and a spring-latch covering the mouth of said notch, the whole operating substantially as set forth.

In testimony that I claim the foregoing as my own I have hereto affixed my signature in presence of two witnesses.

FRANKLIN MANNING.

Witnesses:
EMIEL HELLER,
D. C. EMLEY.